W. McARTHUR, Jr.
TUBULAR LANTERN.
APPLICATION FILED JAN. 4, 1912.
1,070,276.
Patented Aug. 12, 1913.
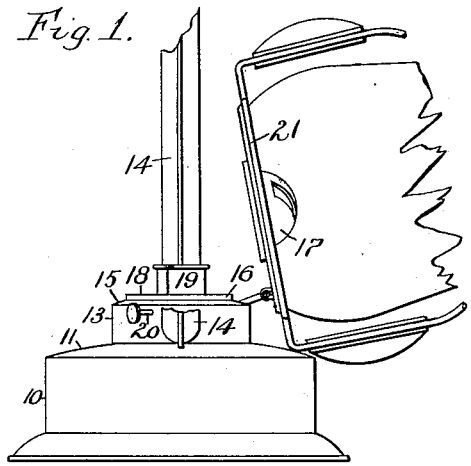
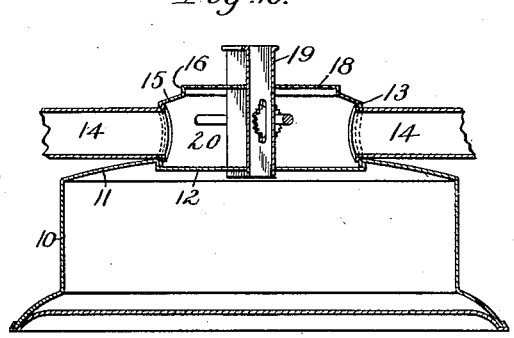
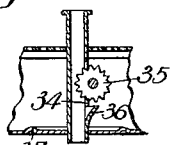
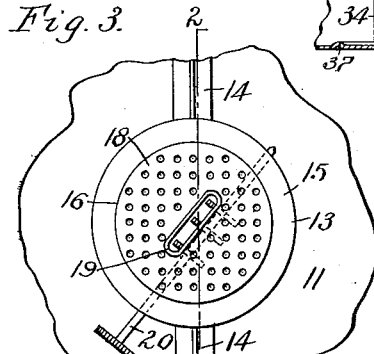
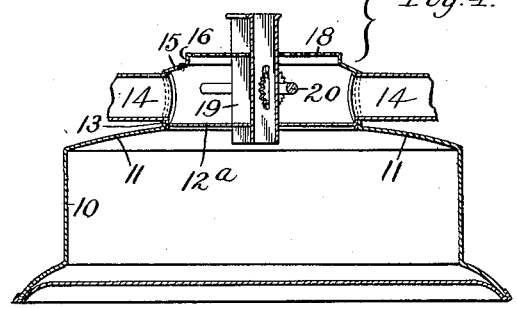
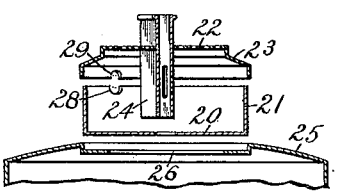
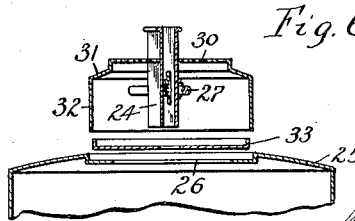
Witnesses:—
Inventor
Attorneys

UNITED STATES PATENT OFFICE.

WARREN McARTHUR, JR., OF CHICAGO, ILLINOIS.

TUBULAR LANTERN.

1,070,276.  Specification of Letters Patent.  Patented Aug. 12, 1913.

Application filed January 4, 1912. Serial No. 669,458.

*To all whom it may concern:*

Be it known that I, WARREN McARTHUR, Jr., a citizen of the United States, residing at Chicago, in the county of Cook and State of Illinois, have invented a new and useful Improvement in Tubular Lanterns, of which the following is a specification.

This invention relates to that class of burner structures in tubular lanterns in which the wick tube and the burner cone are separable, as, for instance, by attaching the cone to a movable globe plate.

Heretofore, the wick tube has usually been secured within a perforated burner body and the latter has been removably seated in a socket in the top of the oil pot, so that upon removing the globe plate and the cone the wick tube could be removed from the burner socket for inserting a new wick, or for other purposes. As the burners in tubular lanterns are slip burners, not secured by screwthreads but simply slipped into the socket, which style of burner must be used in order to place the wick-raiser shaft in the proper position, it has been customary to provide the burner with some fastening device, applied to the shaft or to the skirt of the burner cone, in order to prevent as far as possible the accidental detachment of the burner from its socket, but these fastenings are usually troublesome and often render it difficult to seat the burner properly, especially in the hands of unskilful persons.

The object of this invention is to secure the wick tube permanently to the oil pot, having only the cone removable, thereby simplifying the burner structure, rendering the same strong and durable and avoiding all danger of the burner becoming accidentally detached from the oil pot.

In the accompanying drawings: Figure 1 is a side elevation of the lower portion of a tubular lantern embodying this improved burner structure, the burner cone being secured to the hinged globe plate which is shown swung back in this figure. Fig. 2 is a sectional elevation of the burner structure, on an enlarged scale, with the globe plate and burner cone removed, the section being taken in line 2—2, Fig. 3. Fig. 3 is a top plan view of the burner structure with the globe plate and burner cone removed. Fig. 4 is a sectional elevation showing a modified construction of the burner structure. Figs. 5 and 6 are fragmentary sectional elevations illustrating other modified constructions of the burner structure, the parts of each structure being shown separated. Fig. 7 is a sectional elevation and Fig. 8 a perspective view of the wick tube and adjacent parts.

Like reference characters refer to like parts in the several figures.

Referring to Figs. 1–3, 10 represents the outer cylindrical wall of the oil pot, 11 the outer sloping portion of the top wall, and 12 the depressed horizontal central portion of the top wall, all of which parts may be formed in one piece of sheet metal. 13 represents the outer cylindrical wall of the air chamber which is secured upon the horizontal portion 12 of the top wall of the oil pot and with which the lower ends of the air tubes 14 are connected. 15 represents the sloping top portion of the air chamber, 16 the upright shoulder against which the lower portion of the burner cone 17 fits, and 18 the horizontal top portion of the air chamber which is perforated to permit the passage of air upwardly from the air chamber to the flame. 19 represents the wick tube which penetrates with its lower portion the top portion 12 of the oil pot, which forms the bottom of the air chamber, and with its upper portion the perforated top plate 18 of the air chamber and is permanently secured to these plates. 20 represents the wick-raiser shaft and 21 the hinged globe plate to which the burner cone 17 is attached.

The walls 13, 15, 16 and 18 of the air chamber may be formed of one piece of sheet metal.

The wick tube is firmly held in position on the oil pot by its connection at its lower end with the bottom of the air chamber and its connection near its upper end with the perforated top plate of the air chamber. The perforations in this top plate permit the air to pass from the chamber to the flame at the upper end of the wick tube and prevent to a large extent dirt from entering the air chamber.

The oil pot is closed at the top with the exception of the openings formed by the wick tube and the usual filling orifice and as the wick tube is permanently secured in place there is no danger of the oil being accidentally thrown out of the top of the oil pot, as is liable to happen when a burner loosely seated in a burner socket becomes accidentally detached.

In the burner structure represented in Fig. 4, the walls 10 and 11 of the oil pot and the walls 13, 15, 16 and 18 of the air chamber are formed of one piece of sheet metal and the bottom 12$^a$ of the air chamber, which forms the top of the oil pot, is formed of a separate piece. The burner cone 17$^a$ is shown in this figure as detached from the globe plate and is designed to be sprung or snapped on the shoulder 16 of the air chamber.

In the burner structure represented in Fig. 5, the air chamber comprises a lower part and an upper part which are stamped separately and then secured together. The lower part is composed of a bottom 20 and a peripheral wall 21, and the upper part is composed of a perforated top plate 22 and a flanged sloping breast 23 which fits upon and around the top edge of the peripheral wall 21. The wick tube 24 penetrates the top plate 22 and the bottom 20 and is soldered or otherwise secured to the same. This air chamber is secured upon the top 25 of the oil pot which is provided with an opening 26 for accommodating the wick tube. The wick-raiser shaft 27 can be arranged in notches 28, 29 formed, respectively, in the upper edge of the peripheral wall 21 and in the lower edge of the upper part of the structure.

In the burner structure represented in Fig. 6, the upper part of the air chamber comprises a perforated top plate 30, a sloping breast 31 and a peripheral wall 32 stamped in one piece, and the lower part is formed by a bottom 33 which is soldered or secured to the open lower end of the upper part. This air chamber is secured upon the oil pot in the same manner as the air chamber represented in Fig. 5.

The parts of the burner structures represented in Figs. 5 and 6 are completely secured together before they are secured to the oil pot, thereby facilitating the assembling of the parts.

The escape of oil by seepage through the slots 34 of the wick tube into the air chamber may be guarded against, as represented in Figs. 7 and 8, by forming the wick tube below the wick-raiser wheels 35 with catch or return passages 36 which prevent such oil from passing along the wick tube, and this arrangement may be supplemented by a bead 37 formed on the bottom of the air chamber around the wick tube and forming a shallow catch basin from which any oil reaching the same flows back into the wick tube through an opening 38.

I claim as my invention:

1. The combination with an oil pot, of an air chamber comprising a peripheral wall, a bottom and a perforated top, all permanently secured together and to the oil pot, and a wick tube secured to said bottom and top, substantially as set forth.

2. The combination with an oil pot, of an air chamber comprising a peripheral wall, a bottom and a perforated top, all permanently secured together, said bottom being formed by the top plate of the oil pot, and a wick tube secured to said bottom and top, substantially as set forth.

Witness my hand in the presence of two subscribing witnesses.

WARREN McARTHUR, Jr.

Witnesses:
EDWARD WILHELM,
C. B. HORNBECK.

---

Copies of this patent may be obtained for five cents each, by addressing the "Commissioner of Patents, Washington, D. C."